E. CROOKER.
Fluid Gas Burner.
No. 29,124.
Patented July 10, 1860.
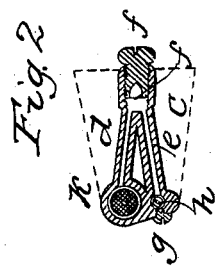
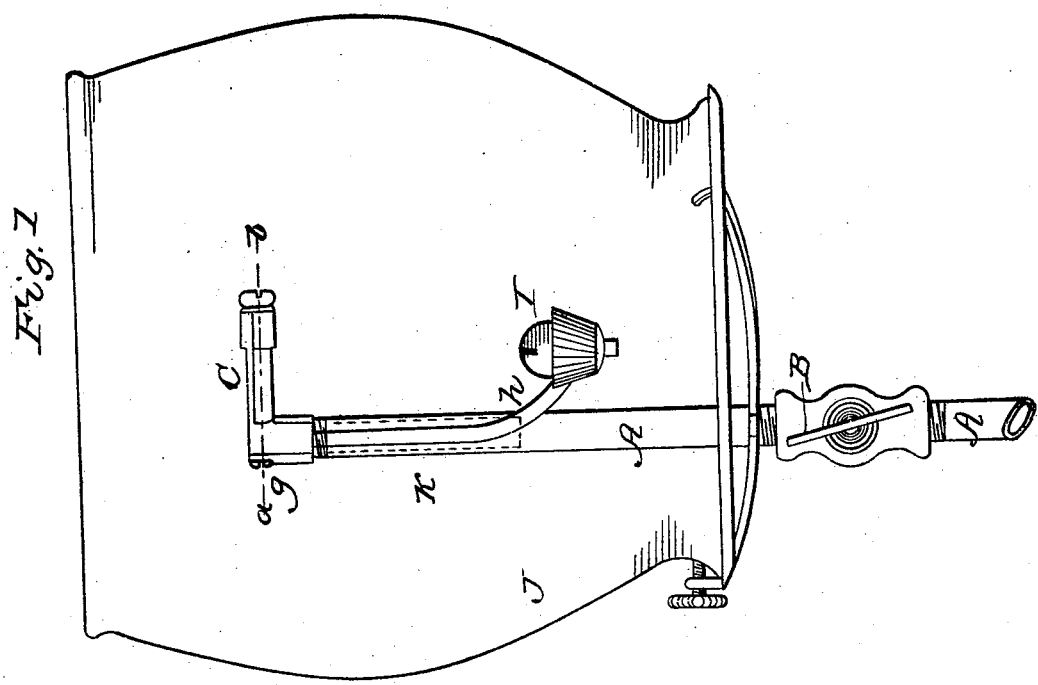
Witnesses
B. Forbush
W. H. Forbush
Inventor
Erastus Crooker

UNITED STATES PATENT OFFICE.

ERASTUS CROOKER, OF BUFFALO, NEW YORK, ASSIGNOR TO HIMSELF AND JEFFERSON T. UPSON, OF SAME PLACE.

VAPOR-LAMP.

Specification of Letters Patent No. 29,124, dated July 10, 1860.

*To all whom it may concern:*

Be it known that I, ERASTUS CROOKER, of the city of Buffalo, county of Erie, and State of New York, have invented a new and Improved Fluid-Gas Generator; and I do hereby declare that the following is a full, clear, and exact description thereof, reference being had to the accompanying drawings and the letters of reference marked thereon.

My said invention consists in the construction and relative arrangement of parts as hereinafter particularly set forth.

To enable others skilled in the art to make and use my invention I will proceed to describe its construction and operation.

Figure I, is a side elevation of my improvement, as connected with the fluid pipe and burner. Fig. II, is a section of the gas generating chambers on line $a$ and $b$ (Fig. I).

A, represents the fluid pipe which is connected with a fluid reservoir which reservoir is located several inches above the gas chambers.

B, is a stop cock, which is used to regulate the flow of the fluid through the pipe A, to the gas chambers.

$c$, (Fig. I) represents the metal body, forming the chambers, as connected with the fluid and gas pipes.

$d$, (Fig. II) is a chamber extending outwardly from the fluid pipe and leading to the recess $f'$ where it intersects or meets the return chamber $e$.

$e$, is the return chamber, which leads to, and connects with the gas pipe.

$f$, is a screw stop, which screws into the body $c$. It has a recess, $f'$, which forms a connection between the two chambers.

$g$, represents a screw stop which connects with chamber $e$; $h$, gas pipe which connects the return chamber $e$, to the burner I; J, glass globe which surrounds the gas generating chambers and burner.

The dotted lines $k$, represent a lamp wick, placed in the pipe A, through which the fluid or vapor must pass before entering the gas generating chambers. It acts as a filter.

When it is desirable to light the burner, heat is applied to the gas generating chambers by means of an auxiliary spirit lamp, until the chambers become sufficiently hot to generate gas. The burner is then lighted and the spirit lamp removed. The flame from the burner then has a direct vertical action upon both chambers, in a manner to secure the advantage of the greatest amount of heat from the flame and the chambers thereby become so intensely hot, that all the fluid or vapor passing in to the chamber $d$, is converted into pure gas by the action of the heat in its passage through the chambers, and before it reaches the burner.

In order to produce a pure gas from fluid, which will make a pure white light, it is necessary to expose it to great heat, and the arrangement of the gas chambers so as to cause the fluid or vapor to take a double passage directly over the flame will expose it to all the heat necessary to produce the best quality of gas.

The light produced by this improvement is pure and white, and exceeds in brilliancy anything of the kind heretofore produced within my knowledge.

By removing the screw stops $f$ and $g$, a wire or swab may be run directly through the chambers, and thereby easily cleanse them from whatever sediment may have collected therein. This may be done with great facility and convenience.

I claim as new and of my invention herein—

The arrangement of the fluid pipe K converging chambers $d$ and $e$, screw stops $f$ and $g$ recess $f'$ and gas pipe $h$ as and for the purposes set forth.

ERASTUS CROOKER.

Witnesses:
E. B. FORBUSH,
W. H. FORBUSH.